US010353955B2

(12) United States Patent
Batides et al.

(10) Patent No.: US 10,353,955 B2
(45) Date of Patent: Jul. 16, 2019

(54) SYSTEMS AND METHODS FOR NORMALIZED SCHEMA COMPARISON

(71) Applicant: LexisNexis, a division of Reed Elsevier Inc., Miamisburg, OH (US)

(72) Inventors: Steve Batides, Colorado Springs, CO (US); Joy Luckabaugh, Montgomery Village, MD (US); Maan Khamis, Dayton, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 325 days.

(21) Appl. No.: 14/932,482

(22) Filed: Nov. 4, 2015

(65) Prior Publication Data

US 2016/0132537 A1 May 12, 2016

Related U.S. Application Data

(60) Provisional application No. 62/076,053, filed on Nov. 6, 2014.

(51) Int. Cl.
*G06F 16/80* (2019.01)

(52) U.S. Cl.
CPC .................. *G06F 16/80* (2019.01)

(58) Field of Classification Search
CPC ......... G06F 17/30908; G06F 17/30911; G06F 16/80; G06F 16/81
See application file for complete search history.

(56) References Cited

U.S. PATENT DOCUMENTS

| 5,970,490 | A | 10/1999 | Morgenstern | |
| 7,392,471 | B1 * | 6/2008 | Ford | G06F 17/2211 715/229 |
| 7,818,665 | B1 * | 10/2010 | Russin | G06F 17/2247 715/236 |

(Continued)

OTHER PUBLICATIONS

International Search Report and Written Opinion dated Feb. 2, 2016 in International Patent Application Serial No. PCT/US2015/059395.

*Primary Examiner* — Jesse P Frumkin

(74) *Attorney, Agent, or Firm* — Dinsmore & Shohl, LLP

(57) ABSTRACT

Systems, methods, and media for generating a normalized schema comparison file are disclosed. A method includes receiving, by a processing device, an extensible markup language (XML) schema for an XML document. The XML schema includes a content model and one or more internal schema structures and the content model is a specification of one or more XML elements and XML attributes allowed within a conformant XML instance file. The method further includes processing the XML schema to resolve and remove the one or more internal schema structures, determining a standardized structure by identifying a definition for each of one or more XML elements and XML attributes to obtain a plurality of definitions, providing the standardized structure in a normalized schema comparison syntax each of the plurality of definitions in alphabetical order to obtain an arranged plurality of definitions, eliminating any redundant definitions present in the arranged plurality of definitions, and generating a normalized schema comparison file containing the arranged plurality of definitions.

20 Claims, 7 Drawing Sheets

(56) References Cited

U.S. PATENT DOCUMENTS

| | | |
|---|---|---|
| 8,984,396 B2* | 3/2015 | Tingstrom ............ G06F 17/227 |
| | | 707/690 |
| 2004/0083199 A1 | 4/2004 | Govindugari et al. |
| 2004/0098667 A1* | 5/2004 | Atkinson ............ G06F 17/2205 |
| | | 715/239 |
| 2004/0199905 A1 | 10/2004 | Fagin et al. |
| 2004/0268240 A1* | 12/2004 | Vincent, III ........ G06F 17/2247 |
| | | 715/234 |
| 2005/0060645 A1* | 3/2005 | Raghavachari ..... G06F 17/2247 |
| | | 715/237 |
| 2005/0192990 A1 | 9/2005 | Kharitidi et al. |
| 2006/0101058 A1 | 5/2006 | Chidlovskii |
| 2007/0050407 A1* | 3/2007 | Chen ................ G06F 17/30908 |
| 2009/0187594 A1* | 7/2009 | Chen ................ G06F 17/30908 |
| 2010/0023471 A1 | 1/2010 | Baldwin et al. |
| 2013/0179769 A1* | 7/2013 | Gurfinkel ............ G06F 17/2211 |
| | | 715/234 |
| 2013/0246480 A1* | 9/2013 | Lemcke ................ G06Q 10/10 |
| | | 707/797 |
| 2014/0207802 A1 | 7/2014 | Raghavan et al. |
| 2015/0026183 A1 | 1/2015 | Tonkin |

\* cited by examiner

```
<?xml version="1.0" encoding="UTF-8"?>
<xs:schema xmlns:xs="http://www.w3.org/2001/XMLSchema" xmlns="http://www.w3.org/2001/XMLSchema"
        elementFormDefault="qualified"
        targetNamespace="http://www.website-xyz.com/xmlschemas/tools/schemacompare/samples/"
        xmlns:sample="http://www.website-xyz.com/xmlschemas/tools/schemacompare/samples/">
    <xs:element name="DocumentElement">
        <xs:complexType>
            <xs:sequence>
                <xs:element name="Element1">
                    <xs:complexType/>
                </xs:element>
                <xs:element name="Element2">
                    <xs:complexType/>
                </xs:element>
                <xs:element name="Element3">
                    <xs:complexType/>
                </xs:element>
            </xs:sequence>
            <xs:attribute name="Attribute1" type="xs:NMTOKEN"/>
            <xs:attribute name="Attribute2" type="xs:NMTOKEN"/>
            <xs:attribute name="Attribute3" type="xs:NMTOKEN"/>
        </xs:complexType>
    </xs:element>
</xs:schema>
```

FIG. 1A

```xml
<?xml version="1.0" encoding="UTF-8"?>
<grammar xmlns="http://relaxng.org/ns/structure/1.0"
  xmlns:sample="http://www.website-xyz.com/xmlschemas/tools/schemacompare/samples/"
  datatypeLibrary="http://www.w3.org/2001/XMLSchema-datatypes">
 <start>
  <ref name="sample.DocumentElement"/>
 </start>
 <define name="sample.DocumentElement">
  <element name="sample:DocumentElement">
   <ref name="attlist_sample.DocumentElement"/>
   <ref name="sample.Element1"/>
   <ref name="sample.Element2"/>
   <ref name="sample.Element3"/>
  </element>
 </define>
 <define name="attlist_sample.DocumentElement">
  <optional>
   <attribute name="Attribute1">
    <data type="NMTOKEN"/>
   </attribute>
  </optional>
  <optional>
   <attribute name="Attribute2">
    <data type="NMTOKEN"/>
   </attribute>
  </optional>
  <optional>
   <attribute name="Attribute3">
    <data type="NMTOKEN"/>
   </attribute>
  </optional>
 </define>
 <define name="sample.Element1">
  <element name="sample:Element1">
   <empty/>
  </element>
 </define>
 <define name="sample.Element2">
  <element name="sample:Element2">
   <empty/>
  </element>
 </define>
 <define name="sample.Element3">
  <element name="sample:Element3">
   <empty/>
  </element>
 </define>
</grammar>
```

FIG. 1B

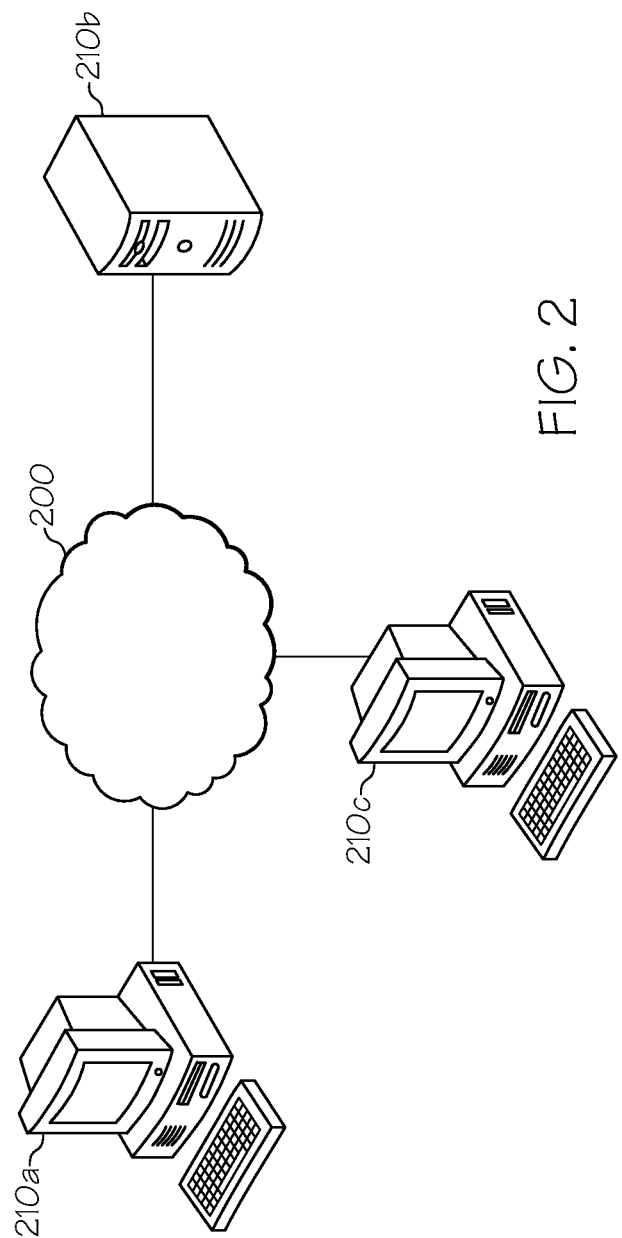

502

```
<?xml version="1.0" encoding="UTF-8"?>
<xs:schema xmlns:xs="http://www.w3.org/2001/XMLSchema"
        xmlns="http://www.website-xyz.com/xmlschemas/tools/schemacompare/samples/"
        elementFormDefault="qualified" attributeFormDefault="unqualified"
        targetNamespace="http://www.website-xyz.com/xmlschemas/tools/schemacompare/samples/"
        xmlns:sample="http://www.website-xyz.com/xmlschemas/tools/schemacompare/samples/">
        <xs:include schemaLocation="Ex2c_module_XSD_Module1.xsd"/>
        <xs:element name="DocumentElement" type="Type1"/>
</xs:schema>
```

```
<?xml version="1.0" encoding="UTF-8"?>
<xs:schema xmlns:xs="http://www.w3.org/2001/XMLSchema"
        xmlns="http://www.website-xyz.com/xmlschemas/tools/schemacompare/samples/"
        elementFormDefault="qualified" attributeFormDefault="unqualified"
        targetNamespace="http://www.website-xyz.com/xmlschemas/tools/schemacompare/samples/"
        xmlns:sample="http://www.website-xyz.com/xmlschemas/tools/schemacompare/samples/">
        <xs:complexType name="Type1">
                <xs:group ref="ElementGroup1"/>
                <xs:attributeGroup ref="AttributeGroup1"/>
        </xs:complexType>
        <xs:group name="ElementGroup1">
                <xs:sequence>
                        <xs:element ref="Element1"/>
                        <xs:element ref="Element2"/>
                        <xs:element ref="Element3"/>
                </xs:sequence>
        </xs:group>
        <xs:attributeGroup name="AttributeGroup1">
                <xs:attribute ref="Attribute1"/>
                <xs:attribute ref="Attribute2"/>
                <xs:attribute ref="Attribute3"/>
        </xs:attributeGroup>
        <xs:element name="Element1">
                <xs:complexType/>
        </xs:element>
        <xs:element name="Element2">
                <xs:complexType/>
        </xs:element>
        <xs:element name="Element3">
                <xs:complexType/>
        </xs:element>
        <xs:attribute name="Attribute1" type="xs:NMTOKEN"/>
        <xs:attribute name="Attribute2" type="xs:NMTOKEN"/>
        <xs:attribute name="Attribute3" type="xs:NMTOKEN"/>
</xs:schema>
```

```
<?xml version="1.0" encoding="UTF-8"?>
<xs:schema xmlns:xs="http://www.w3.org/2001/XMLSchema"
        xmlns="http://www.website-xyz.com/xmlschemas/tools/schemacompare/samples/"
        elementFormDefault="qualified" attributeFormDefault="unqualified"
        targetNamespace="http://www.website-xyz.com/xmlschemas/tools/schemacompare/samples/"
        xmlns:sample="http://www.website-xyz.com/xmlschemas/tools/schemacompare/samples/">
        <xs:element name="DocumentElement" type="Type1"/>
        <xs:complexType name="Type1">
                <xs:group ref="ElementGroup1"/>
                <xs:attributeGroup ref="AttributeGroup1"/>
        </xs:complexType>
        <xs:group name="ElementGroup1">
                <xs:sequence>
                        <xs:element ref="Element1"/>
                        <xs:element ref="Element2"/>
                        <xs:element ref="Element3"/>
                </xs:sequence>
        </xs:group>
        <xs:attributeGroup name="AttributeGroup1">
                <xs:attribute ref="Attribute1"/>
                <xs:attribute ref="Attribute2"/>
                <xs:attribute ref="Attribute3"/>
        </xs:attributeGroup>
        <xs:element name="Element1">
                <xs:complexType/>
        </xs:element>
        <xs:element name="Element2">
                <xs:complexType/>
        </xs:element>
        <xs:element name="Element3">
                <xs:complexType/>
        </xs:element>
        <xs:attribute name="Attribute1" type="xs:NMTOKEN"/>
        <xs:attribute name="Attribute2" type="xs:NMTOKEN"/>
        <xs:attribute name="Attribute3" type="xs:NMTOKEN"/>
</xs:schema>
```

FIG. 5B

SYSTEMS AND METHODS FOR NORMALIZED SCHEMA COMPARISON

CROSS-REFERENCE TO RELATED APPLICATIONS

This application claims the benefit of U.S. Provisional Patent Application Ser. No. 62/076,053, entitled "SYSTEMS AND METHODS FOR NORMALIZED SCHEMA COMPARISON," filed on Nov. 6, 2014, the entire disclosure of which is hereby incorporated by reference herein.

BACKGROUND

Field

The present specification generally relates to methods, systems, and media for comparing data and, more particularly, to generating a normalized schema comparison file for use in comparing structures allowed in XML files conforming to an associated XML schema.

Technical Background

Currently, extensible markup language (XML) schemas can be created in one or more different schema languages. While such schemas may place identical constraints on an XML document, they may use different syntax to achieve such constraints. Use of different syntax across different schema languages or different syntax in the same schema language makes it very difficult to compare schemas to each other using an automated difference tool.

Accordingly, a need exists for a normalized schema comparison file that is used as a reference for an automated difference tool in comparing the allowable XML structures from a plurality of XML schemas to a conforming XML instance file, regardless of syntax or schema language used in each XML schema.

SUMMARY

In one embodiment, a method of generating a normalized schema comparison file includes receiving, by a processing device, an XML schema for an XML document. The XML schema includes a content model and one or more internal schema structures and the content model is a specification of one or more XML elements and XML attributes allowed within a conformant XML instance file. The method further includes processing, by the processing device, the XML schema to resolve and remove the one or more internal schema structures, determining, by the processing device, a standardized structure by identifying a definition for each of one or more XML elements and XML attributes to obtain a plurality of definitions, providing, by the processing device, the standardized structure in a normalized schema comparison syntax each of the plurality of definitions in alphabetical order to obtain an arranged plurality of definitions, eliminating, by the processing device, any redundant definitions present in the arranged plurality of definitions, and generating, by the processing device, a normalized schema comparison file containing the arranged plurality of definitions.

In another embodiment, a system for generating a normalized schema comparison file may include a processing device and a non-transitory, processor-readable storage medium. The non-transitory, processor-readable storage medium includes one or more programming instructions that, when executed, cause the processing device receive an XML schema for an XML document. The XML schema includes a content model and one or more internal schema structures. The content model is a specification of one or more XML elements and XML attributes allowed within a conformant XML instance file. The non-transitory, processor-readable storage medium further includes one or more programming instructions that, when executed, cause the processing device to process the XML schema to resolve and remove the one or more internal schema structures, determine a standardized structure by identifying a definition for each of one or more XML elements and XML attributes to obtain a plurality of definitions, provide the standardized structure in a normalized schema comparison syntax, arrange each of the plurality of definitions in alphabetical order to obtain an arranged plurality of definitions, eliminate any redundant definitions present in the arranged plurality of definitions, and generate a normalized schema comparison file containing the arranged plurality of definitions.

In yet another embodiment, a non-transitory, processor-readable storage medium for generating a normalized schema comparison file includes one or more programming instructions for executing the following process: receiving an XML schema for an XML document. The XML schema includes a content model and one or more internal schema structures and the content model is a specification of one or more XML elements and XML attributes allowed within a conformant XML instance file. The non-transitory, processor-readable storage medium further includes one or more programming instructions for executing the following processes: processing the XML schema to resolve and remove the one or more internal schema structures, determining a standardized structure by identifying a definition for each of one or more XML elements and XML attributes to obtain a plurality of definitions, providing the standardized structure in a normalized schema comparison syntax, arranging each of the plurality of definitions in alphabetical order to obtain an arranged plurality of definitions, eliminating any redundant definitions present in the arranged plurality of definitions, and generating a normalized schema comparison file containing the arranged plurality of definitions.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 1A depicts an illustrative XSD schema according to one or more embodiments shown and described herein;

FIG. 1B depicts an illustrative RNG schema according to one or more embodiments shown and described herein;

FIG. 2 schematically depicts an illustrative computing network for a system for normalizing XML schemas according to one or more embodiments shown and described herein;

FIG. 5A depicts illustrative schema modules that can be normalized into a single file according to one or more embodiments shown and described herein; and FIG. 5B depicts a single file that has been normalized according to one or more embodiments shown and described herein.

DETAILED DESCRIPTION

Figure 3:
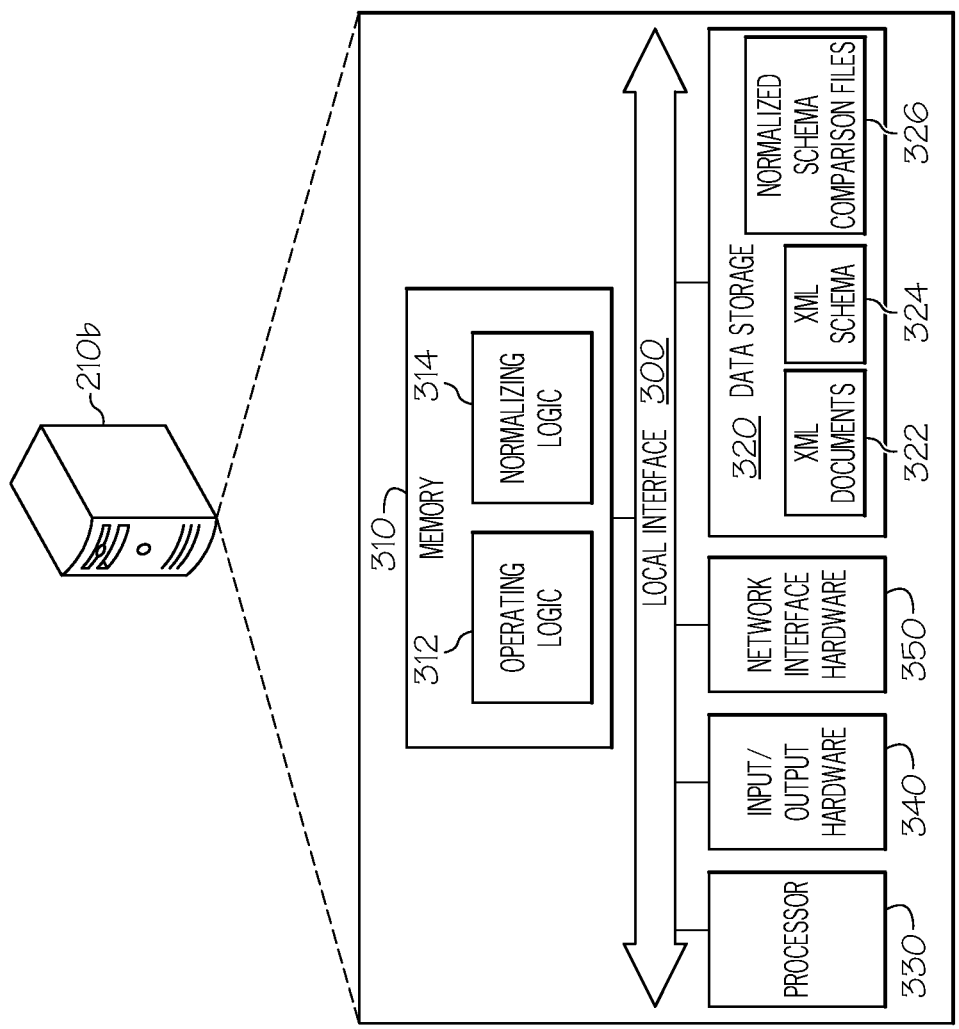
FIG. 3 schematically depicts the server computing device from FIG. 2, further illustrating hardware and software that may be used in providing data according to one or more embodiments shown and described herein.

The methods, systems, and storage media described herein relate to generating a normalized schema comparison file that can be used by an automated difference tool for comparing the resulting allowable structures in an XML instance file as defined by one or more associated XML schemas. Such a comparison can be completed regardless of the schema language that is used for each XML schema and regardless of the syntax that is used in a particular schema for structuring the XML schema. The methods, systems, and storage media described herein are configured to ignore all internal schema structures and focus solely on the resulting definitions of elements that are defined by each XML schema. That is, the methods, systems, and storage media described herein can be used to recognize whether a first schema that defines an XML document element a first way is identical to a second schema that defines the same XML document element in a second way. Such methods, systems, and storage media provide an advantage because they do not require a line-by-line comparison of the first and second XML schemas, which would be time consuming and may not recognize that certain constraints imposed by the first and second XML schemas are identical.

An XML schema is a language for expressing constraints about XML documents. XML is a markup language that defines a set of rules for encoding electronic documents in a format that is both readable by a human and readable by a machine, particularly a computing device. As such, an XML document (and therefore the XML schema) is necessarily rooted in computers and computer technology because it relates entirely to coding electronic documents for computer use. That is, use of an XML schema for encoding an XML document would not exist outside of computer technology.

An XML schema can be used, for example, to provide a list of elements and attributes in a vocabulary, to associate types (e.g., an integer, a string, and/or the like, or specific definitions such as "shirt_size," "glasses_color," or the like) with values found in documents, to constrain where elements and attributes can appear, as well as what can appear inside those elements (e.g., specifying that a chapter title occurs inside a chapter and/or a chapter must include a chapter title followed by one or more paragraphs of text), to provide documentation that is both human-readable and machine-processable, and to give a formal description of one or more documents.

An XML schema exists to aid in the definition of XML-based languages, and thus defines a customized XML data. However, several different schema languages are in widespread use, such as, for example, Document Type Definitions (DTSs), Relax-NG (RNG), Schematron, and World Wide Web Consortium (W3C) XSD. Different XML schema may describe identical, similar, or totally different XML data structures. Because of all the detailed syntax used to represent an XML schema, and to facilitate its use by various other tools and software, it is often very difficult to compare one schema to another, and thus the resulting structure allowed in an XML document(s) that is conformant to the XML schemas. There may be differences even if the ultimate valid XML data structure defined by a plurality of schema is identical. For example, a first schema may define an element Z as containing 2 groups of child elements, group A and group B. Elsewhere, the XML schema may define group A as containing child element z1 and child element z2 and group B containing child element z3 and child element z4. In contrast, a second schema may define element Z as containing child element z1, child element z2, child element z3, and child element z4. Both the first schema and the second schema each require element Z to contain child elements z1, z2, z3 and z4, but they are structured very differently.

In another example, FIG. 1A depicts an illustrative XSD schema and FIG. 1B depicts an illustrative RNG schema. Both schemas provide the same constraints on a particular set of data, but as shown in FIGS. 1A and 1B, the XML schemas express the data output in different ways. The plurality of different ways of defining the same value gives rise to a difficulty in making an automated comparison of different schema.

FIG. 2 is an illustrative computing network that depicts components for a system for querying an XML content model for element and attribute data models, generating a normalized XML schema comparison syntax, and outputting a normalized XML schema comparison document for use in comparing XML documents, according to embodiments shown and described herein. As illustrated in FIG. 2, a computer network 200 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 200 may generally be configured to electronically connect one or more computing devices and/or components thereof. Illustrative computing devices may include, but are not limited to, a user computing device 210a, a server computing device 210b, and an administrator computing device 210c.

The user computing device 210a may generally be used as an interface between the user and the other components connected to the computer network 200. Thus, the user computing device 210a may be used to perform one or more user-facing functions, such as receiving one or more inputs from a user or providing information to the user, as described in greater detail herein. In some embodiments, the user computing device 210a may contain one or more software programs and/or the like for comparing XML documents.

Additionally, included in FIG. 2 is the administrator computing device 210c. In the event that the server computing device 210b requires oversight, updating, or correction, the administrator computing device 210c may be configured to provide the desired oversight, updating, and/or correction. The administrator computing device 210c may also be used to input additional data into a corpus stored on the server computing device 210b.

The server computing device 210b may receive data from one or more sources, store the data, provide data to one or more recipients, such as the user computing device 210a, query an XML schema content model for element and attribute data models, generate a normalized XML schema comparison syntax, and output a normalized XML schema comparison document.

It should be understood that while the user computing device 210a and the administrator computing device 210c are depicted as personal computers and the server computing device 210b is depicted as a server, these are nonlimiting examples. More specifically, in some embodiments, any type of computing device (e.g., mobile computing device, personal computer, server, etc.) may be used for any of these components. Additionally, while each of these computing devices is illustrated in FIG. 2 as a single piece of hardware, this is also merely an example. More specifically, each of the user computing device 210a, server computing device 210b, and administrator computing device 210c may represent a plurality of computers, servers, databases, components, and/or the like.

In addition, it should be understood that while the embodiments depicted herein refer to a network of computing devices, the present disclosure is not solely limited to such a network. For example, in some embodiments, the various processes described herein may be completed by a single computing device, such as a non-networked computing device or a networked computing device that does not use the network to complete the various processes described herein.

FIG. 3 depicts the server computing device 210b from FIG. 2, further illustrating a system for receiving data from one or more sources, storing the data, providing the data to one or more recipients, querying an XML schema content model for element and attribute data models, generating a normalized XML schema comparison syntax, and outputting a normalized XML schema comparison document. In addition, the server computing device 210b may include a non-transitory computer-readable medium for querying an XML schema content model for element and attribute data models, generating a normalized XML schema comparison syntax, and outputting a normalized XML schema comparison document, according to embodiments shown and described herein. While in some embodiments the server computing device 210b may be configured as a general purpose computer with the requisite hardware, software, and/or firmware, in some embodiments, the server computing device 210b may also be configured as a special purpose computer designed specifically for performing the functionality described herein.

As also illustrated in FIG. 3, the server computing device 210b may include a processor 330, input/output hardware 340, network interface hardware 350, a data storage component 320 (which may store XML documents 322, XML schema 324, and normalized schema comparison files 326), and a non-transitory memory component 310. The memory component 310 may be configured as volatile and/or non-volatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 310 may be configured to store operating logic 312 and normalizing logic 314 (each of which may be embodied as a computer program, firmware, or hardware, as an example). A local interface 300 is also included in FIG. 3 and may be implemented as a bus or other interface to facilitate communication among the components of the server computing device 210b.

The processor 330 may include any processing component configured to receive and execute instructions (such as from the data storage component 320 and/or memory component 310). The input/output hardware 340 may include a monitor, keyboard, mouse, printer, camera, microphone, speaker, touch-screen, and/or other device for receiving, sending, and/or presenting data. The network interface hardware 350 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 320 may reside local to and/or remote from the server computing device 210b and may be configured to store one or more pieces of data and provide access to the one or more pieces of data. As illustrated in FIG. 3, the data storage component 320 may store XML documents 322 and XML schema 324 related to the XML documents 322, as described in greater detail herein. In addition, the data storage component 320 may also store one or more normalized schema comparison files 326, as described in greater detail herein.

Included in the memory component 310 are the operating logic 312 and the normalizing logic 314. The operating logic 312 may include an operating system and/or other software for managing components of the server computing device 210b. The normalizing logic 314 may be configured to create a schema comparison document for normalizing XML schema, as described in detail below.

It should be understood that the components illustrated in FIG. 3 are merely illustrative and are not intended to limit the scope of this disclosure. More specifically, while the components in FIG. 3 are illustrated as residing within the server computing device 210b, this is a nonlimiting example. In some embodiments, one or more of the components may reside external to the server computing device 210b. Similarly, while FIG. 3 is directed to the server computing device 210b, other components such as the user computing device 210a and the administrator computing device 210c (FIG. 2) may include similar hardware, software, and/or firmware.

Figure 4:
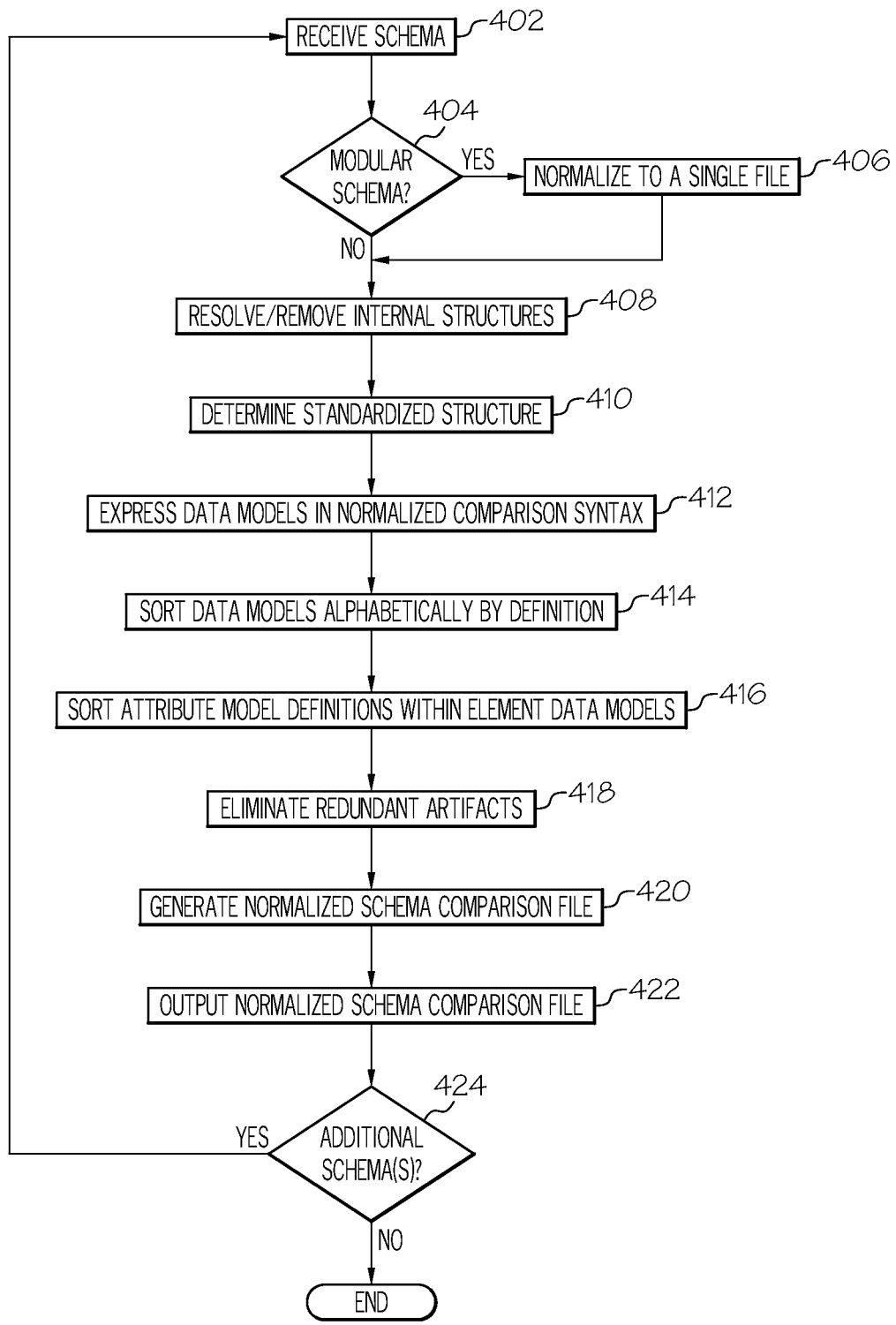
FIG. 4 schematically depicts a flow diagram of an illustrative method of generating a normalized schema comparison file by querying an XML schema content model for elements and attributes according to one or more embodiments shown and described herein.

FIG. 4 depicts a flow diagram of an illustrative method of generating a normalized schema comparison file by querying an XML schema content model for elements and attributes. Such querying may generally be completed as a first step to creating a file that can be used for comparing the meaning of XML document structures from a plurality of XML schemas to a conforming XML instance file. That is, the processes described with respect to FIG. 4 may be used in understanding the meaning of an XML document structure, regardless of which schema is used to define elements and attributes of the XML document structure.

As shown in step 402, an XML schema may be received. An XML schema may be received from an XML schema repository, such as, for example, the XML schemas stored in the data storage component 320 (FIG. 3). In some embodiments, the XML schema that is obtained may be, for example, an XML schema that is to be compared to one or more other XML schemas. The XML schema may generally contain a content model, which is a specification of various XML elements and XML attributes allowed within a conformant XML instance file, including the relative structure and placement in which the XML elements and XML attributes are allowed, and what type of data the XML elements and XML attributes are allowed to contain. FIGS. 1A and 1B, as described hereinabove, provide illustrative examples of content models within XML schemas.

In some embodiments, an XML schema may include a plurality of schema modules. A schema module is an XML schema component that provides definitions of various structural elements. In order to generate an effective comparison syntax, the XML schema may be "flattened" to a single schema module so that all structural elements appear in the same schema module. Thus, as shown in step 404, if the XML schema is modular (i.e., containing a plurality of modules, such as nested modules), the XML schema may be normalized to a single file in step 406. If the XML schema does not include a plurality of modules, step 406 may be skipped. Normalizing the XML schema to a single file may generally include combining all definitions that exist in the various modules into a single file and removing all syntax related to the inclusion or import of such modules. In a nonlimiting example, an XML schema may include module 1, which contains syntax to include modules 2 and 3. In addition, module 2 contains the definition of element "A" and module 3 contains the definition of element "B". Normalizing the XML schema to a single file would result in a file that contains the content of module 1, but with the syntax to include modules 2 and 3 removed. In addition, the single file also contains the content of modules 2 and 3, which include, but are not limited to, the definitions of element "A" and element "B". Another nonlimiting example of normalizing an XML schema is depicted in FIGS. 5A and 5B. As shown in FIG. 5A, a first schema module 502 and a second schema module 504 may be normalized to a single file 506, which is shown in FIG. 5B. The single file 506 contains the content of the first schema module 502 and the second schema module 504, but omits a reference made in the first schema module 502 to the second schema module 504.

Referring again to FIG. 4, in various embodiments, the XML schema may contain various internal structures that relate to a structure of the XML document, but are irrelevant for the purposes of comparison. For example, certain internal structures may relate to how the XML schema itself is arranged, but have no bearing on the resultant XML instance document structure that is ultimately dictated by the XML schema. Illustrative internal structures include groups, patterns, types, and references. However, it should be understood that the internal structures are not limited to these, and may include other internal structures. A group may generally refer to how the XML schema groups data internally. A pattern may generally refer to how the XML schema arranges data for access. A type may generally refer to how data is structured within a hierarchy. A reference may generally refer to how the XML schema relates a reference to one or more other definitions. Since the internal structures only relate to how the XML schema is structured and are irrelevant for the purposes of comparing of the content model represented by the XML schema, they may be processed such that they are resolved and/or removed in step 408. Resolving and/or removing the internal structures may include, for example, deleting the internal structure information from the document and inserting the relevant associated content model information in the data artifact that references the internal structure information. It should be generally understood that other methods of resolving and/or removing the internal structures may be used without departing from the scope of the present disclosure.

In step 410, a standardized structure is determined. It should generally be understood that the standardized structure defines each element existing and referenced within the XML schema, with each definition including, but not limited to, a specified datatype and other restrictions and extensions of the defined element, the datatype and other restrictions and extensions of the element's attributes, and the cardinality, ordinality and/or other restrictions and extensions of the element's child elements and text content. Specifications for child elements and text content include any required groupings of child elements and ordinality of such groupings. Accordingly, determining the standardized structure includes identifying each element, each of the element's child elements and text content, as well as a definition associated therewith. Determining such a standardized structure ensures that the definitions of elements within one XML schema's content model contain the same types of information as the definitions of elements within any other XML schema's content model.

A nonlimiting example of a standardized structure may include a structure that specifies that element "A" contains an attribute "date" which is of datatype xs:date, and contains a choice of either element "B" or element "C", followed by exactly 2 occurrences of element "D". The same standardized structure might further specify that element "B" is empty, element "C" contains only attribute "RefNo" of datatype xs:integer, and element D contains only attribute "ReplyNeeded" of datatype xs:boolean.

A restriction or extension of an element or attribute generally refers to the concept of element and attribute extensions and restrictions as defined in any schema definition syntax, including, but not limited to, a standardized syntax such as, for example, a W3C XML Schema Definition or a RELAX NG schema language specification. In some embodiments, the standardized structure includes a specification of the type of restriction or extension, and all related information required to fully describe the constraints represented by the restriction or extension defined for the element or attribute in the XML schema.

A cardinality of a child element refers to a number of possible times a particular element must occur within an element defined by the XML schema, and is included in the standardized structure. A nonlimiting example of cardinality may be that the standardized structure specifies that element "B" must occur as a child element of Element "A" exactly 3 times.

An ordinality of a child element refers to its positioning relative to other child elements, or groups of elements, within an element defined by the XML schema, and included in the standardized structure. That is, the ordinality of a child element may be, for example, a first child element, a second child element, a third child element within the second sequence group of child elements, and so on and so forth, relative to other elements in the XML schema. For example, the standardized structure might specify that the ordinality of child elements "B", "C" and "D" within defined element "A" must be "A" followed by a group choice of "B" or "C" followed by "D".

A datatype of an element or attribute refers to the type of content that is allowed within that element or attribute. Datatype values are defined by the allowed datatypes for elements and attributes as defined in the W3C XML Schema Definition Language (http://www.w3.org/TR/xmlschema11-1/). Illustrative examples of datatype values in the standardized structure include, but are not limited to, "xs:date" and "xs:integer".

Once the standardized structure has been determined, a normalized schema comparison syntax may be generated from the standardized structure. Accordingly, in step 412, the discovered data models may be provided (expressed) in a normalized XML schema comparison syntax based on their elements and attribute definitions. That is, the data models may be normalized in such a way that the syntax used is the same across all content models of XML schemas that may be compared. Once the syntax has been normalized, the definitions of elements of each data model may be sorted alphabetically by their names in step 414. Similarly, in step 416, the definitions of attributes for each element may also be sorted alphabetically.

Once the alphabetical sorting has been completed in steps 414 and 416, a clean-up process may be instituted, thereby eliminating redundant artifacts, as shown in step 418. The redundant artifacts may be, for example, certain data models or elements and attributes thereof that appear in more than one XML schema (including definitions thereof). Since the data model elements and/or attributes thereof are identical, at least one may be removed or eliminated from the file so that only a single listing of the data model element and/or attribute thereof is present. Thus, the resulting file may appear to be similar to an XML schema on its face, but is generally understood to not be an XML schema.

In step 420, a normalized schema comparison file may be generated from the normalized, sorted, and cleaned data models. In step 422, the normalized schema XML file may be saved and/or outputted for use. The file may be outputted to any recipient, such as, for example, the user computing device 210a or the administrator computing device 210c (FIG. 2). In another example, the file may be outputted to a repository, such as the data storage component 320 (FIG. 2). The file may be used for the purposes of comparing structures allowed in XML instance documents that are conformant to the XML schema to structure allowed in XML instance files that are conformant to a different XML schema. In some embodiments, comparison may be completed, for example, by an automated difference tool, such as a tool that is embodied by one or more software modules. An automated difference tool may generally be any software testing tool that can be used to determine differences between a plurality of subjects, such as XML documents, text documents, and/or the like. In order to ensure that the automated difference tool is able to read the file, the file may be outputted in a suitable format. Particular formats that are readable by automated difference tools should generally be recognized. It should be understood that the use of the file is not limited by this disclosure, and may used for any comparison purposes, regardless of whether such comparison is specifically disclosed herein.

In some embodiments, the steps described with respect to FIG. 4 may be completed for each of a plurality of XML schemas. For example, the steps described with respect to FIG. 4 may be completed for each of the XML schemas contained in the data storage component 320 (FIG. 3). Thus, in step 424, a determination may be made as to whether additional XML schemas may be processed. If so, the process may repeat at step 402. If not, the process may end.

It should now be understood that embodiments described herein create and provide a file for use in comparing XML schemas, particularly the resulting allowable structure of an XML document conformant to an associated XML schema. Such a file can be used by automated difference tools and/or the like to quickly compare XML schemas and determine differences between XML schemas, thereby saving time associated with a manual comparison. Moreover, the document can be used for comparison regardless of the type of XML schema used, the language in which the XML schema is written, and the structure of the XML schema itself.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of generating a normalized schema comparison file that is used as a reference for an automated difference tool, the method comprising:
    receiving, by a processing device, an extensible markup language (XML) schema for an XML document, wherein the XML schema comprises a content model and one or more internal schema structures, the content model is a specification of one or more XML elements and XML attributes allowed within a conformant XML instance file;
    processing, by the processing device, the XML schema to resolve and remove the one or more internal schema structures;
    determining, by the processing device, a standardized structure by identifying a definition for each of one or more XML elements and XML attributes to obtain a plurality of definitions, wherein the standardized structure comprises a specification of a type of restriction or extension and all related information required to fully describe constraints represented by the restriction or extension defined for each of the one or more XML elements and XML attributes in the XML schema;
    providing, by the processing device, the standardized structure in a normalized schema comparison syntax;
    arranging, by the processing device, each of the plurality of definitions of the standardized structure in alphabetical order to obtain an arranged plurality of definitions;
    eliminating, by the processing device, any redundant definitions present in the arranged plurality of definitions;
    generating, by the processing device, the normalized schema comparison file containing the arranged plurality of definitions from the standardized structure, wherein the normalized schema comparison file is separate from the XML schema for the XML document; and
    outputting, by the processing device, the normalized schema comparison file to the automated difference tool, the normalized schema comparison file allowing the automated difference tool to compare a first XML schema language and a second XML schema language to an XML instance file.

2. The method of claim 1, wherein outputting the normalized schema comparison file comprises:
    outputting, by the processing device, the normalized schema comparison file to a repository that is accessed by the automated difference tool.

3. The method of claim 1, wherein outputting the normalized schema comparison file comprises outputting the normalized schema comparison file in a format that is readable by the automated difference tool.

4. The method of claim 1, wherein the XML schema further comprises a plurality of schema modules, each one of the plurality of schema modules providing one or more definitions of structural elements of the XML schema.

5. The method of claim 4, further comprising:
    prior to processing, normalizing, by the processing device, the XML schema to a single schema module.

6. The method of claim 5, wherein normalizing comprises combining a plurality of definitions contained within each of the plurality of schema modules into a single file and removing syntax related to an inclusion or import of at least one of the schema modules.

7. The method of claim 1, wherein the one or more internal schema structures comprise at least one of a group, a pattern, a type, and a reference.

8. The method of claim 1, wherein identifying the definition for each of the one or more XML elements and XML attributes comprises defining, by the processing device, each of one or more elements based on one or more of a specified datatype, restrictions, and extensions of an element, a datatype and other restrictions and extensions of an element's attributes, and a cardinality, ordinality and/or other restrictions and extensions of an element's child elements and text content.

9. The method of claim 1, wherein the XML schema is written in a first schema language is selected from Document Type Definitions (DTSs), Relax-NG, Schematron, and W3C XSD and the second schema language is selected from another one of Document Type Definitions (DTSs), Relax-NG, Schematron, and W3C XSD.

10. A system for generating a normalized schema comparison file that is used as a reference for an automated difference tool, the system comprising:
   a processing device; and
   a non-transitory, processor-readable storage medium, the non-transitory, processor-readable storage medium comprising one or more programming instructions that, when executed, cause the processing device to:
      receive an extensible markup language (XML) schema for an XML document, wherein the XML schema comprises a content model and one or more internal schema structures, the content model is a specification of one or more XML elements and XML attributes allowed within a conformant XML instance file;
      process the XML schema to resolve and remove the one or more internal schema structures;
      determine a standardized structure by identifying a definition for each of one or more XML elements and XML attributes to obtain a plurality of definitions, wherein the standardized structure comprises a specification of a type of restriction or extension and all related information required to fully describe constraints represented by the restriction or extension defined for each of the one or more XML elements and XML attributes in the XML schema;
      provide the standardized structure in a normalized schema comparison syntax;
      arrange each of the plurality of definitions of the standardized structure in alphabetical order to obtain an arranged plurality of definitions;
      eliminate any redundant definitions present in the arranged plurality of definitions;
      generate the normalized schema comparison file containing the arranged plurality of definitions from the standardized structure, wherein the normalized schema comparison file is separate from the XML schema for the XML document; and
      output the normalized schema comparison file to the automated difference tool, the normalized schema comparison file allowing the automated difference tool to compare a first XML schema language and a second XML schema language to an XML instance file.

11. The system of claim 10, wherein the one or more programming instructions that, when executed, cause the processing device to output the normalized schema comparison file comprises one or more programming instructions that, when executed, cause the processing device to:
      output the normalized schema comparison file to a repository that is accessed by the automated difference tool.

12. The system of claim 10, wherein the normalized schema comparison file is in a format that is readable by the automated difference tool.

13. The system of claim 10, wherein the XML schema comprises a plurality of schema modules.

14. The system of claim 13, wherein the non-transitory, processor-readable storage medium further comprises one or more programming instructions that, when executed, cause the processing device to:
      prior to processing, normalize the XML schema to a single schema module.

15. The system of claim 10, wherein the one or more internal schema structures comprise at least one of a group, a pattern, a type, and a reference.

16. The system of claim 10, wherein the one or more programming instructions that, when executed, cause the processing device to identify the definition for each of the one or more XML elements and XML attributes further cause the processing device to define each of one or more elements based on one or more of a specified datatype and other restrictions and extensions of an element, a datatype and other restrictions and extensions of an element's attributes, and a cardinality, ordinality and/or other restrictions and extensions of an element's child elements and text content.

17. A non-transitory, processor-readable storage medium for generating a normalized schema comparison file that is used as a reference for an automated difference tool, the non-transitory, processor-readable storage medium comprising one or more programming instructions for executing the following processes:
   receiving an extensible markup language (XML) schema for an XML document, wherein the XML schema comprises a content model and one or more internal schema structures, the content model is a specification of one or more XML elements and XML attributes allowed within a conformant XML instance file;
   processing the XML schema to resolve and remove the one or more internal schema structures;
   determining a standardized structure by identifying a definition for each of one or more XML elements and XML attributes to obtain a plurality of definitions, wherein the standardized structure comprises a specification of a type of restriction or extension and all related information required to fully describe constraints represented by the restriction or extension defined for each of the one or more XML elements and XML attributes in the XML schema;
   providing the standardized structure in a normalized schema comparison syntax;
   arranging each of the plurality of definitions of the standardized structure in alphabetical order to obtain an arranged plurality of definitions;
   eliminating any redundant definitions present in the arranged plurality of definitions;
   generating the normalized schema comparison file containing the arranged plurality of definitions from the standardized structure, wherein the normalized schema comparison file is a reference file that is distinct from the XML schema for the XML document; and
   outputting the normalized schema comparison file to the automated difference tool, the normalized schema comparison file allowing the automated difference tool to compare a first XML schema language and a second XML schema language to an XML instance file.

18. The non-transitory, processor-readable storage medium of claim 17, wherein the one or more programming instructions for outputting the normalized schema comparison file further comprises one or more programming instructions for executing the following process:
   outputting the normalized schema comparison file to a repository that is accessed by the automated difference tool.

19. The non-transitory, processor-readable storage medium of claim 17, wherein the XML schema comprises a plurality of schema modules.

20. The non-transitory, processor-readable storage medium of claim 19, further comprising one or more programming instructions for executing the following process:
   prior to processing, normalizing the XML schema to a single schema module.

* * * * *

UNITED STATES PATENT AND TRADEMARK OFFICE
CERTIFICATE OF CORRECTION

PATENT NO. : 10,353,955 B2
APPLICATION NO. : 14/932482
DATED : July 16, 2019
INVENTOR(S) : Batides et al.

Page 1 of 1

It is certified that error appears in the above-identified patent and that said Letters Patent is hereby corrected as shown below:

In the Claims

In Column 11, Claim 9, Line 13 through Line 14, delete "wherein the XML schema is written in a first schema" and insert --wherein the first schema--, therefor.

Signed and Sealed this
Twenty-sixth Day of November, 2019

Andrei Iancu
*Director of the United States Patent and Trademark Office*